(12) United States Patent
Okel et al.

(10) Patent No.: US 7,687,107 B2
(45) Date of Patent: *Mar. 30, 2010

(54) PROCESS FOR PRODUCING CHEMICALLY MODIFIED AMORPHOUS PRECIPITATED SILICA

(75) Inventors: Timothy A. Okel, Trafford, PA (US); James R. Hahn, Midland, MI (US); Raymond R. Ondeck, McMurray, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 991 days.

This patent is subject to a terminal disclaimer.

(21) Appl. No.: 11/013,583

(22) Filed: Dec. 16, 2004

(65) Prior Publication Data

US 2005/0131107 A1 Jun. 16, 2005

Related U.S. Application Data

(63) Continuation-in-part of application No. 09/636,312, filed on Aug. 11, 2000, now abandoned.

(60) Provisional application No. 60/203,427, filed on May 10, 2000, provisional application No. 60/172,308, filed on Dec. 17, 1999, provisional application No. 60/149,758, filed on Aug. 19, 1999.

(51) Int. Cl.
*B05D 7/00* (2006.01)

(52) U.S. Cl. .................. 427/212; 427/215; 427/220

(58) Field of Classification Search ............... 427/212, 427/220, 215
See application file for complete search history.

(56) References Cited

U.S. PATENT DOCUMENTS

| | | | |
|---|---|---|---|
| 3,317,145 A * | 5/1967 | Stephanoff ............. 241/5 |
| 3,690,823 A * | 9/1972 | Young ................. 423/700 |
| 3,692,812 A | 9/1972 | Berger ............... 260/448.2 E |
| 3,768,537 A | 10/1973 | Hess et al. .............. 152/330 |
| 3,873,489 A | 3/1975 | Thurn et al. ......... 260/33.6 AQ |
| 3,922,436 A | 11/1975 | Bell et al. ............... 428/375 |
| 3,997,356 A | 12/1976 | Thurn et al. |
| 4,076,550 A | 2/1978 | Thurn et al. ........... 106/288 Q |
| 4,359,342 A | 11/1982 | Stacy et al. ............. 523/216 |
| 4,436,847 A | 3/1984 | Wagner ................ 523/203 |
| 4,474,908 A | 10/1984 | Wagner |
| 4,704,414 A | 11/1987 | Kerner et al. ............ 523/213 |
| 5,009,874 A | 4/1991 | Parmentier et al. ........ 423/335 |
| 5,116,886 A | 5/1992 | Wolff et al. ............. 523/209 |
| 5,580,919 A | 12/1996 | Agostini et al. .......... 524/430 |
| 5,601,749 A * | 2/1997 | Hall et al. .............. 510/336 |
| 5,705,137 A | 1/1998 | Goerl et al. ............ 423/335 |
| 5,708,069 A * | 1/1998 | Burns et al. ............ 524/403 |
| 5,763,388 A | 6/1998 | Lightsey et al. ......... 523/212 |
| 5,840,532 A | 11/1998 | McKnight et al. |
| 5,846,311 A | 12/1998 | Bomal et al. |
| 5,876,494 A | 3/1999 | Bomal et al. |
| 5,908,660 A | 6/1999 | Griffith et al. ........... 427/220 |
| 5,919,298 A | 7/1999 | Griffith et al. ........... 106/490 |
| 5,973,083 A * | 10/1999 | Matsushita et al. ....... 526/129 |
| 5,985,953 A | 11/1999 | Lightsey et al. ......... 523/212 |
| 6,022,923 A | 2/2000 | Araki et al. ............. 524/494 |
| 6,033,597 A | 3/2000 | Yatsuyanagi et al. ... 252/182.17 |
| 6,051,672 A | 4/2000 | Burns et al. ............ 528/10 |
| 6,342,560 B1 | 1/2002 | Okel |
| 6,384,125 B1 * | 5/2002 | Bergstrom et al. ........ 524/492 |
| 6,649,684 B1 | 11/2003 | Okel |
| 6,736,891 B1 | 5/2004 | Bice et al. |

FOREIGN PATENT DOCUMENTS

| | | |
|---|---|---|
| EP | 795 579 A1 | 9/1997 |
| EP | 849 320 A1 | 6/1998 |
| EP | 0 875 532 | 11/1998 |
| EP | 890 600 A1 | 1/1999 |
| EP | 0 900 829 | 3/1999 |
| EP | 0 928 818 | 7/1999 |
| EP | 931 812 A1 | 7/1999 |
| GB | 1439247 | 6/1976 |
| JP | 10-316406 A | 12/1998 |
| WO | WO 98/47955 | 10/1998 |
| WO | WO 99/09036 | 2/1999 |
| WO | WO 01/12733 A | 2/2001 |
| WO | WO 2004/031302 A2 | 4/2004 |

OTHER PUBLICATIONS

Kirk-Othmer, Encyclopedia of Chemical Technology, (4th ed.), vol. 19, J. Wiley and Sons, 1996, pp. 881-904.
J.W. Lightsey et al., DSM Copolymer, Inc., "Silica Wet Masterbatch: A New Process for Pre-Dispersion of Silica in Emulsion Polymers", ACS Meeting, Oct. 1997.
A. Krysztafkiewicz, "Modified Silica Precipitated in the Medium of Organic Solvents-an Active Rubber Filler", Colloid & Polymer Science, vol. 267, pp. 399-408, 1989.

* cited by examiner

*Primary Examiner*—Elena T Lightfoot
(74) *Attorney, Agent, or Firm*—Frank P. Mallak; Deborah M. Altman

(57) ABSTRACT

Described is an improved process for producing chemically modified fillers by using a certain combination of functionalizing and hydrophobizing agents in an aqueous suspension of inorganic oxide having a pH of 2.5 or less and increasing the pH of the suspension after chemically treating the filler.

12 Claims, No Drawings

PROCESS FOR PRODUCING CHEMICALLY MODIFIED AMORPHOUS PRECIPITATED SILICA

CROSS REFERENCE TO RELATED APPLICATIONS

This application is a continuation in part of U.S. patent application having Ser. No. 09/636,312, filed on Aug. 11, 2000, now abandoned which claims the benefit of U.S. Provisional Patent Applications having Ser. No. 60/203,427, filed May 10, 2000; 60/172,308, filed Dec. 17, 1999; and 60/149,758, filed Aug. 19, 1999.

JOINT RESEARCH AGREEMENT: PPG Industries, Inc. (now PPG Industries Ohio, Inc.) and Dow Corning Corporation executed an agreement (effective Sep. 7, 1995) for joint research and technology sharing in the field of "Treated Silicas", the field of this invention.

DESCRIPTION OF THE INVENTION

The present invention relates to methods for making chemically modified fillers. More particularly, this invention relates to processes for producing particulate or amorphous fillers that have minimum carbon and sulfur contents, a minimum Silane Conversion Index, and that provide a minimum Standard Tensile Stress @300% elongation. Further, this invention relates to a process for producing a functionalized and hydrophobized precipitated filler, hereinafter referred to as a "modified filler", that can improve the efficiency of producing polymeric compositions, such as in rubber compounding, and the performance of polymerized or cured rubber products, such as but not limited to tires.

In the production of polymeric compositions, it is known to incorporate reinforcing fillers to improve the physical properties of the polymer. The surfaces of such fillers can be modified to increase the reactivity and consequently the two- and three-dimensional coupling of the filler within the polymeric composition. It is conventional in the rubber industry to incorporate carbon black and other reinforcing fillers into natural and synthetic rubber to increase the physical properties of the cured rubber vulcanizate. Fillers used to reinforce such polymeric compositions can include natural and synthetic fillers.

One of the non-black fillers used in the rubber industry is amorphous precipitated silica. This siliceous filler can be used to impart improved tensile strength, tear resistance and abrasion resistance to the rubber vulcanizate. Silica fillers also can be used in combination with carbon blacks to obtain increased mileage in passenger vehicle tires and off-the-road tires, e.g., tires for mining and logging operations and for road-building equipment. Such applications are known to one having ordinary skill in the art. When used as the sole reinforcing filler, silica fillers that are not well dispersed and/or coupled in the rubber do not provide the overall improved performance that can be obtained by the use of carbon blacks alone. This can be observed in rubber vulcanizates used for tires, e.g., tire treads.

Various coupling agents, e.g., titanates, zirconates and silanes, have been suggested for use with silica fillers when such fillers are incorporated into polymeric compositions, e.g., rubber, in order to improve the performance of the rubber vulcanizate. Among the various organosilane coupling agents suggested for such use are the bis(alkoxysilylalkyl)polysulfides, e.g., 3,3'-bis(triethoxysilylpropyl)tetrasulfide.

The high cost of bis(alkoxysilylalkyl)polysulfides, and the time and energy required to mix them into rubber polymeric compositions have deterred the more general use of siliceous fillers as the principal reinforcing filler in large volume rubber applications. One drawback in using alkoxysilanes as coupling agents for silica fillers is that they produce off-gases. In particular, hydrolysis of the alkoxy group(s) results in the release of alcohol some of which is retained in the surrounding elastomer matrix. The portion of the alcohol retained in the surrounding elastomer matrix can result in porous zones or blisters which can form surface defects in the resulting formed rubber article and/or can impair the dimensional stability of treads during extrusion and tire building. This evolution and off-gassing of alcohol continues through the life of a product manufactured from an elastomer compounded with alkoxysilane coupling agents.

It has now been discovered that an improved modified filler, e.g., a particulate or amorphous inorganic oxide, that is characterized by a carbon content of greater than 1 wt. %, a sulfur content of greater than 0.1 wt. %, a Silane Conversion Index (described hereinafter) of at least 0.3, and a Standard Tensile Stress at 300% elongation (also described hereinafter) of 7 or more can be prepared. The modified filler of the present invention can be produced by utilizing a certain combination of functionalizing and hydrophobizing agents in an aqueous suspension of inorganic oxide having a pH of 2.5 or less and treating the acidic aqueous suspension of modified fillers with acid neutralizing agents to increase the pH of the suspension to a range of from 3.0 to 10.

As used herein, a functionalizing agent is a reactive chemical which can cause an inorganic oxide to be covalently bonded to the polymeric composition in which it is used. A hydrophobizing agent is a chemical which can bind to and/or be associated with an inorganic oxide to the extent that it causes a reduction in the affinity for water of the inorganic oxide while increasing the inorganic oxide's affinity for the organic polymeric composition in which it is used.

The aforementioned Standard Tensile Stress @ 300% elongation (i.e., STS@300%) of at least 7 or greater indicates improved reinforcement of the rubber composition. Improved reinforcement translates into an improvement in the mechanical durability of the product which is evidenced by increased tear strength, hardness and abrasion resistance. In addition to the improved properties, the modified filler has the benefit of requiring less time and energy to get incorporated into the polymeric composition.

DETAILED DESCRIPTION OF THE INVENTION

Other than in the operating examples, or where otherwise indicated, all numbers expressing quantities, ratios, ranges, etc. used herein are to be understood as modified in all instances by the term "about".

The modified filler of the present invention can be produced by any method that results in such a filler, i.e., an inorganic oxide, having a carbon content of greater than 1 wt. %, or at least 1.5 wt. %, or at least 2.0 wt. %; a sulfur content of greater than 0.1 wt. %, or at least 0.3 wt. %, or at least 0.6 wt. %; a Silane Conversion Index, of at least 0.3, or at least 0.4, or at least 0.5 and a Standard Tensile Stress at 300% elongation of at least 7.0, or at least 7.5, or at least 8.0. The modified filler of the present invention can further be characterized by a Brunauer-Emmett-Teller (BET) single point surface area of from 20 to 350 $m^2/g$, or from 40 to 300 $m^2/g$, or from 100 to 200 $m^2/g$, a pH of from 5 to 10, or from 5.5 to 9.5, or from 6.0 to 9.0, or from 6.5 to 7.5 or the pH of the product can vary between any combination of these values, inclusive of the recited ranges; and a Soxhlet Extractable percent carbon of less than 30 percent, or less than 25 percent, or less than 20 percent, e.g., 15 percent. The methods for determining the aforestated characteristics of the modified filler are described in Example 9.

A wide variety of fillers known to a skilled artisan can be used to prepare the modified filler of the present invention. Suitable fillers can include but are not limited to inorganic oxides selected from precipitated silica, colloidal silica or mixtures thereof. In addition, the inorganic oxide can be a material which is suitable for use in the various molding, compounding or coating processes including but not limited to injection molding, lamination, transfer molding, compression molding, rubber compounding, coating (such as dipping, brushing, knife coating, roller coating, silk screen coating, printing, spray coating and the like), casting, and the like.

In a non-limiting embodiment, the inorganic oxide used to produce the modified filler of the present invention can be a precipitated silica of the type commonly employed for compounding with rubber. Various commercially available silica materials can be used in this invention. In alternate non-limiting embodiments, the silica can include silica commercially available from PPG Industries under the Hi-Sil trademark with designations 210, 243, etc; silica available from Rhone-Poulenc, with, for example, designations of Z1165 MP and Z165GR and silica available from Degussa AG with, for example, designations VN2 and VN3, etc.

The precipitated silica used to produce the modified filler of the present invention can be prepared by various methods known to one having ordinary skill in the art. In a non-limiting embodiment, the precipitated silica can be prepared by acidic precipitation from solutions of silicates, e.g., sodium silicate. The method of preparing the precipitated silica can be selected based on the desired properties of the silica, such as surface area and particle size required for a given application.

In alternate non-limiting embodiments of the present invention, the BET surface area of the precipitated silica used in preparing the modified filler of the present invention will generally be within a range of from 50 m$^2$/g to 1000 m$^2$/g, or from 100 m$^2$/g to 500 m$^2$/g.

In alternate non-limiting embodiments, the precipitated silica used to form the modified filler can be in the form of an aqueous suspension from production stages that precede the drying step, such as a slurry formed during precipitation or as a re-liquefied filter cake; or the suspension can be formed by re-dispersing dried silica into an aqueous and/or organic solvent. The concentration of hydrophilic precipitated silica in the aqueous and/or organic suspension is not critical and can be within a range of from 1 to 90 wt. %, or the concentration of hydrophilic precipitated silica can be within a range of from 1 to 50 wt. %, or within a range of from 1 to 20 wt. %.

The Silane Conversion Index can be defined by the equation $T^3/(T^1+T^2+T^3)$. The values for $T^1$, $T^2$ and $T^3$ can be determined by solid state $^{29}$Si NMR and represent reacted silane units. The Silane Conversion Index provides an indication of the degree of reaction or crosslinking of the silanes on adjacent Si atoms and with each other. In general, the higher the index number, the greater the amount of crosslinking amongst the silane, silica surface and adjacent silanes. $T^1$ represents a silane unit chemically bonded at one site to either the silica surface or another silane. $T^2$ represents a silane unit chemically bonded at two sites to either a Si atom on the silica surface and to one adjacent silane, two adjacent silanes or to two adjacent surface Si atoms, i.e., partially crosslinking structures. $T^3$ represents a silane unit chemically bonded at three sites to either a Si atom on the silica surface and two adjacent silanes, two Si atoms and one silane or three silane units.

It is believed that an Organometallic Reactant Conversion Index, comparable to the Silane Conversion Index, can be developed and used by those skilled in the art of coupling agents to provide an indication of the degree of reaction or crosslinking of zirconates and/or titanates (alone or in combination with silanes) with the inorganic oxide and themselves.

The Standard Tensile Stress @ 300% elongation can be determined using a Standard Compounding Protocol. The Standard Compounding Protocol described herein does not include the addition of free or unbounded coupling agents to the rubber batch. Typically, the addition of such coupling agents to a rubber batch can require more time for mixing by the compounder.

The organic polymeric compositions, e.g., plastics and/or resin, in which the modified filler can be present include essentially any organic plastic and/or resin. Included in this definition are rubber compounds. Such polymers are described in *Kirk Othmer Encyclopedia of Chemical Technology*, Fourth Edition, 1996, Volume 19, pp 881-904, which description is herein incorporated by reference. In a non-limiting embodiment, the modified filler can be admixed with the polymer or the polymerizable components thereof while the physical form of the polymer or polymerizable components is in any liquid or compoundable form such as a solution, suspension, latex, dispersion, and the like. The polymeric compositions containing the modified filler can be milled, mixed, molded and cured, by any manner known in the art, to form a polymeric article. In a non-limiting embodiment, the polymeric article can have dispersed therein from 10 to 150 parts per 100 parts polymer of modified filler. Suitable polymers can include but are not limited to thermoplastic and thermosetting resins, rubber compounds and other polymers having elastomeric properties.

The polymers can include alkyd resins, oil modified alkyd resins, unsaturated polyesters, natural oils (e.g., linseed, tung, soybean), epoxides, nylons, thermoplastic polyester (e.g., polyethyleneterephthalate, polybutyleneterephthalate), polycarbonates, i.e., thermoplastic and thermoset, polyethylenes, polybutylenes, polystyrenes, polypropylenes, ethylene propylene co- and terpolymers, acrylics (homopolymer and copolymers of acrylic acid, acrylates, methacrylates, acrylamides, their salts, hydrohalides, etc.), phenolic resins, polyoxymethylene (homopolymers and copolymers), polyurethanes, polysulfones, polysulfide rubbers, nitrocelluloses, vinyl butyrates, vinyls (vinyl chloride and/or vinyl acetate containing polymers), ethyl cellulose, the cellulose acetates and butyrates, viscose rayon, shellac, waxes, ethylene copolymers (e.g., ethylene-vinyl acetate copolymers, ethylene-acrylic acid copolymers, ethyleneacrylate copolymers), organic rubbers and the like.

The amount of modified filler that can be used in a polymeric composition can vary. In a non-limiting embodiment, the amount of modified filler can be from 5 up to 70 wt. %, based on the total weight of the plastic composition. For example, the typical amount of modified filler used in ABS (acrylonitrile-butadiene-styrene) copolymer can be from 30 to 60 wt. %, acrylonitrile-styrene-acrylate copolymer can be from 5 to 20 wt. %, aliphatic polyketones can be from 15 to 30 wt. %, alkyds resins (for paints and inks) can be from 30 to 60 wt. %, thermoplastic olefins can be from 10 to 30 wt. %, epoxy resins can be from 5 to 20 wt. %, ethylene vinylacetate copolymer can be up to 60 wt. %, ethylene ethyl acetate copolymer can be up to 80 wt. %, liquid crystalline polymers (LCP) can be from 30 to 70 wt. %, phenolic resins can be from 30 to 60 wt. % and in polyethylene the amount can be greater than 40 wt. %.

In a non-limiting embodiment, the polymer can be an organic rubber. Non-limiting examples of such rubbers can include but are not limited to natural rubber; those formed from the homopolymerization of butadiene and its homologues and derivatives such as: cis-1,4-polyisoprene; 3,4-polyisoprene; cis-1,4-polybutadiene; trans-1,4-polybutadiene; 1,2-polybutadiene; and those formed from the copolymerization of butadiene and its homologues and derivatives with one or more copolymerizable monomers containing ethylenic unsaturation such as styrene and its derivatives, vinyl-pyridine and its derivatives, acrylonitrile, isobutylene and alkyl-substituted acrylates such as methylmethacrylate. Further non-limiting examples can include styrene-butadiene copolymer rubber composed of various percentages of styrene and butadiene and employing the various isomers of butadiene as desired (hereinafter "SBR"); terpolymers of styrene, isoprene and butadiene polymers, and their various isomers; acrylonitrile-based copolymer and terpolymer rubber compositions; and isobutylene-based rubber compositions; or a mixture thereof, as described in, for example, U.S. Pat. Nos. 4,530,959; 4,616,065; 4,748,199; 4,866,131; 4,894,420; 4,925,894; 5,082,901; and 5,162,409.

Non-limiting examples of suitable organic polymers can include copolymers of ethylene with other high alpha olefins such as propylene, butene-1 and pentene-1 and a diene monomer. The organic polymers can be block, random, or sequential and can be prepared by methods known in the art such as but not limited to emulsion (e.g. e-SBR) or solution polymerization processes (e.g., s-SBR). Further non-limiting examples of polymers for use in the present invention can include those which are partially or fully functionalized including coupled or star-branched polymers. Additional non-limiting examples of functionalized organic rubbers can include polychloroprene, chlorobutyl and bromobutyl rubber as well as brominated isobutylene-co-paramethylstyrene rubber. In a non-limiting embodiment, the organic rubbers can be polybutadiene, s-SBR and mixtures thereof.

In a non-limiting embodiment, the polymeric composition can be a curable rubber. The term "curable rubber" is intended to include natural rubber and its various raw and reclaimed forms as well as various synthetic rubbers. For example, curable rubber could include combinations of SBR and butadiene rubber (BR), SBR, BR and natural rubber and any other combinations of materials previously disclosed as organic rubbers. In the description of this invention, the terms "rubber", "elastomer" and "rubbery elastomer" can be used interchangeably, unless indicated otherwise. The terms "rubber composition", "compounded rubber" and "rubber compound" are used interchangeably to refer to rubber which has been blended or mixed with various ingredients and materials, and such terms are well-known to those having skill in the rubber mixing or rubber compounding art.

The modified filler of the present invention can be prepared using a variety of methods known to one having ordinary skill in the art. In alternate non-limiting embodiments, the modified filler can be prepared by using step A alone or both steps A and B for preparing hydrophobic silica and fumed silica disclosed in U.S. Pat. Nos. 5,908,660 and 5,919,298, respectively, which relevant disclosure is incorporated herein by reference, with the following changes. The amount of acid used results in a pH of 2.5 or less in the aqueous suspension, or a pH of 2.0 or less, or a pH of 1.0 or less, or a pH of 0.5 or less; the modifying chemical used is a combination of bis(alkoxysilylalkyl)polysulfide and a non-sulfur containing organometallic compound, which is referred to hereinafter as non-sulfur organometallic compound, in a weight ratio of the bis(alkoxysilylalkyl)polysulfide to the non-sulfur organometallic compound of at least 0.05:1, or from 0.05:1 to 10:1, or from 0.1:1 to 5:1, or from 0.2:1 to 2:1, e.g., from 0.5:1 to 1:1, or the weight ratio can vary between any combination of these values, inclusive of the recited values; and after the chemical treatment reaction is completed, the acidity (either added or generated in situ by the hydrolysis of halogenated organometallic compounds) is neutralized. In a non-limiting embodiment, after completing the chemical treatment reaction, the pH of the resulting aqueous suspension is increased to a pH range of from 3 to 10. The neutralizing agents can be selected from a wide variety of such materials that are known in the art to increase the pH of an acidic solution. The neutralizing agent should be selected such that the properties of the modified filler are not adversely effected. Non-limiting examples of suitable neutralizing agents can include but are not limited to sodium hydroxide, potassium hydroxide, ammonium hydroxide and sodium bicarbonate. In another non-limiting embodiment, neutralization of the modified filler can be accomplished by adding gaseous ammonia to the aqueous solution during spray drying.

The acid used in step (A) can be selected from a wide variety of acids, including organic and/or inorganic. In a non-limiting embodiment, the acid catalyst can be inorganic. Non-limiting examples of suitable acid catalysts can include but are not limited to hydrochloric acid, hydrobromic acid, hydroiodic acid, sulfuric acid, nitric acid, phosphoric acid, and benzenesulfonic acid. One acid catalyst or a mixture of two or more acid catalysts can be employed as desired. In a non-limiting embodiment, when the organometallic reactant is a chlorosilane, the catalytic amount of the acid can be generated in situ by hydrolysis of the chlorosilane or the reaction of the chlorosilane directly with hydroxyls of the inorganic oxide.

The temperature at which step (A) is conducted is not critical and can be within the range of from 20° C. to 250° C., although somewhat lesser or somewhat greater temperatures can be used when desired. The reaction temperature will depend on the reactants used, e.g., the organometallic compound(s), the acid and, if used, a co-solvent. In a non-limiting embodiment, step (A) is conducted at temperatures in the range of from 30° C. to 150° C. In another non-limiting embodiment, step (A) can be conducted at the reflux temperature of the slurry used in step (A).

In the afore-described reaction, the modifying chemical or coupling agent can be a combination of functionalizing agent(s) in place of bis(alkoxysilylalkyl)polysulfide and hydrophobizing agent(s) in place of a non-sulfur organometallic compound. The combination of functionalizing and hydrophobizing agents can be used in the same weight ratios specified for the combination of bis(alkoxysilylalkyl) polysulfide to the non-sulfur organometallic compound. Non-limiting examples of reactive groups that the functionalizing agent can contain include, but are not limited to, vinyl, epoxy, glycidoxy and (meth)acryloxy. Further non-limiting examples can include sulfide, polysulfide and mercapto groups provided they are not associated with the reactants represented by chemical formulae I and VI, included herein. As the hydrophobizing agents, suitable materials can include, but are not limited to, chemicals such as natural or synthetic fats and oils and the non-sulfur organometallic compounds represented by chemical formulae II, III, IV, V and mixtures of such hydrophobizing agents.

The initial step of contacting the acidic aqueous suspension of precipitated silica with a combination of bis(alkoxysilylalkyl)polysulfide and non-sulfur organometallic compound, such as a non-sulfur organosilicon compound, can further include adding a water miscible solvent in amounts sufficient to facilitate their reaction with the precipitated silica. The solvent can act as a phase transfer agent speeding-up the interaction of the combination of hydrophobic sulfur and non-sulfur organometallic compounds with the hydrophilic inorganic oxide. In alternate non-limiting embodiments, when water-miscible organic solvent is used, the amount of the water-miscible organic solvent can comprise at least 5 wt. % of the aqueous suspension, or from 15 to 50 wt. %, or from 20 to 30 wt. % of the aqueous suspension, or the wt. % can vary between any combination of these values, inclusive of the recited values. Non-limiting examples of suitable water-miscible solvents can include but are not limited to alcohols such as ethanol, isopropanol and tetrahydrofuran. In a non-limiting embodiment, isopropanol can be used as the water-miscible organic solvent.

In alternate non-limiting embodiments, a surfactant can be used in the initial step, either in combination with the water-miscible organic solvent or in place of the water-miscible organic solvent, in an amount sufficient to facilitate the chemical modification of the inorganic oxide by the bis(alkoxysilylalkyl)polysulfide and the non-sulfur compound. The surfactant can be selected from nonionic, anionic, cationic, amphoteric or a mixture of such surfactants. The surfactant can be selected such that it does not have an adverse effect on the performance of the resulting chemically modified inorganic oxide for its intended use. In alternate non-limiting embodiments, when used, the surfactant can be present in an amount of from 0.05 to 10 wt. % of the aqueous suspension, or from 0.1 to 5 wt. %, or from 0.1 to 3 wt. %, or the wt. % can vary between any combination of these values, inclusive of the recited values.

Non-limiting examples of suitable surfactants can include but are not limited to alkylphenolpolyglycol ethers, e.g., p-octylphenolpolyethyleneglycol (20 units) ether, p-nonylphenolpolyethyleneglycol (20 units) ether, alkylpolyethyleneglycol ethers, e.g., dodecylpolyethyleneglycol (20 units) ether, polyglycols, e.g., polyethyleneglycol 2000, alkyltrimethylammonium salts, e.g., cetyltrimethylammonium chloride (or bromide), dialkyldimethylammonium salts, e.g., dilauryldimethylammonium chloride, alkylbenzyltrimethylammonium salts, alkylbenzenesulfonates, e.g., sodium p-dodecylbenzenesulfonate, sodium p-nonylbenzenesulfonate, alkylhydrogen sulfates, e.g., lauryl hydrogen sulfate, and alkyl sulfates, e.g., lauryl sulfate. In a non-limiting embodiment, the surfactant can include a polysiloxane polymer or copolymer having an allyl end blocked polyethylene oxide.

In a non-limiting embodiment, the bis(alkoxysilylalkyl)polysulfides used to produce the modified fillers of the present invention can include those described in U.S. Pat. Nos. 3,873,489 and 5,580,919, which relevant disclosure is incorporated herein by reference, and can be represented by the following formula I:

Z-alk-S<sub>n'</sub>-alk-Z      I wherein alk can be a divalent hydrocarbon radical having from 1 to 18, or 1 to 6, or 2 to 3, carbon atoms; n' can be a whole number of 2 to 12, or 2 to 6, or 3 to 4; and Z can be:

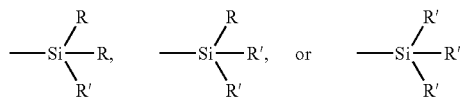

wherein R can be an alkyl group having from 1 to 4 carbon atoms or phenyl, and R' can be an alkoxy group having from 1 to 8, or from 1 to 4, or from 1 to 2, carbon atoms, a cycloalkoxy group with from 5 to 8 carbon atoms, or a straight or branched chain alkylmercapto group with from 1 to 8 carbon atoms. The R and R' groups can be the same or different. The divalent alk group can be straight or branched chain, a saturated or unsaturated aliphatic hydrocarbon group or a cyclic hydrocarbon group. In a non-limiting embodiment, a high purity organosilane disulfide as disclosed in U.S. Pat. No. 5,580,919 which requires that 80 percent of n' in formula I is 2, can be used.

Non-limiting examples of suitable bis(alkoxysilylalkyl)polysulfides can include: the bis(2-trialkoxysilylethyl)polysulfide in which the trialkoxy group can be trimethoxy, triethoxy, tri(methylethoxy), tripropoxy, tributoxy, etc. up to trioctyloxy and the polysulfide can be the di-, tri-, tetra-, penta-, and hexasulfide. The corresponding bis(3-trialkoxysilylpropyl)-, bis(3-trialkoxysilylisobutyl), -bis(4-trialkoxysilylbutyl)-, etc. up to bis(6-trialkoxysilyl-hexyl)polysulfide can also be used. In non-limiting embodiments, organosilanes including the bis(3-trimethoxy-, -triethoxy-, and -ripropoxysilyl-propyl)polysulfide; such as, the di-, tri- and tetrasulfides, can be used.

Further non-limiting examples of suitable bis(alkoxysilylalkyl)-polysulfides are described in column 6, lines 5-55 of the aforesaid U.S. Pat. No. 3,873,489 and in column 11, lines 11-41 of U.S. Pat. No. 5,580,919. Non-limiting representative examples of such compounds are: 3,3'bis(trimethoxysilylpropyl)disulfide, 3,3'-bis(triethoxysilylpropyl)tetrasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, and 3,3'-bis(trioctoxysilylpropyl)tetrasulfide and mixtures thereof. The most preferred compound is 3,3'-bis(triethoxysilylpropyl)tetrasulfide (TESPT).

TESPT is available under the trade name Si-69 from Degussa Corp. It is reported to be a mixture of 3,3'-bis(triethoxysilylpropyl)monosulfide, 3,3'-bis(triethoxysilylpropyl)disulfide, 3,3'-bis(triethoxysilylpropyl)trisulfide, 3,3'-bis(triethoxysilylpropyl)tetrasulfide and higher sulfide homologues having an average sulfide of 3.5.

In alternate non-limiting embodiments, the non-sulfur organometallic compounds that can be used to produce the modified filler of the present invention can include at least one non-sulfur organometallic compound or a mixture of non-sulfur organometallic compounds selected from the group consisting of: organometallic compound(s) represented by formula II:

$$R^1{}_a MX_{(4-a)} \quad \quad \text{II}$$

organometallic compound(s) represented by formula III:

$$R^2{}_{2c+2} Si_c O_{(c-1)} \quad \quad \text{III}$$

organometallic compound(s) represented by the formula IV:

$$R^3{}_{2d} Si_d O_d \quad \quad \text{IV}$$

and organometallic compound(s) represented by formula V:

$$(R^2{}_3 Si)_k NR^4{}_{(3-k)} \quad \quad \text{V}$$

wherein each M can be independently silicon, titanium or zirconium; each $R^1$ can be independently a hydrocarbon group of from 1 to 18 carbon atoms or $R^1$ can be an organofunctional hydrocarbon group of from 1 to 12 carbon atoms where, for example, the functionality can be amino, carboxylic acid, carbinol ester, or amido; each X can be independently selected from the group consisting of halogen, amino, alkoxy groups of from 1 to 12 carbon atoms and acyloxy groups of from 1 to 12 carbon atoms, a can be the integer 1, 2 or 3; each $R^2$ can be independently halo, hydroxy, or a hydrocarbon group containing from 1 to 18 carbon atoms with the proviso that at least 50 mole percent of the $R^2$ substituents can be hydrocarbon groups containing from 1 to 18 carbon atoms, c can be an integer from 2 to 10,000; each $R^3$ can be independently halo, hydroxy, or a hydrocarbon group containing from 1 to 18 carbon atoms and d can be an integer from 3 to 20; each $R^4$ can be independently hydrogen or a hydrocarbon group containing from 1 to 18 carbon atoms and k can be 1 or 2; and the halogen or (halo) groups can be selected from chloro, bromo, iodo or fluoro. In the definition of the substituents shown in formulae II, III, IV and V, like symbols have the same meaning unless stated otherwise.

In alternate non-limiting embodiments, in formula II each $R^1$ can be a saturated or unsaturated monovalent hydrocarbon group or a substituted or non-substituted monovalent hydrocarbon group. $R^1$ can be alkyl groups such as methyl, ethyl, propyl, iso-propyl, iso-butyl, t-butyl, n-butyl, pentyl, hexyl, heptyl, octyl, nonyl, decyl, and dodecyl; alkenyl groups such as vinyl, allyl, and hexenyl; substituted alkyl groups such as chloromethyl, 3,3,3-trifluoropropyl, and 6-chlorohexyl; cycloalkyl groups, such as cyclohexyl and cyclooctyl; aryl groups such as phenyl and naphthyl; and substituted aryl groups such as benzyl, tolyl and ethylphenyl.

In further alternate non-limiting embodiments, when X is a halogen in formula II, the halogen can be chloro; when X is an alkoxy group, X can be methoxy, ethoxy, and propoxy; when X is an acyloxy group, X can be acetoxy. In another non-limiting embodiment, X can be selected from chloro and methoxy.

The viscosity of the afore-described organometallic compounds is not limiting and can range from that of a fluid to a gum. Generally, higher molecular weight organometallic compounds should be cleaved by the acidic conditions of the chemical modification step allowing them to react with the hydrophilic inorganic oxide.

In non-limiting embodiments, in formulae III, IV and V, each $R^2$, $R^3$ and $R^4$ can be the same as the hydrocarbon groups described for $R^1$. For purposes of the present invention, when the organometallic reactant is an organosilicon reactant, the silicon is considered to be a metal.

In further non-limiting embodiments, the non-sulfur organometallic compound(s) can be represented by formulae II, III, IV, V or a mixture of said organometallic compounds wherein each M can be silicon. In a non-limiting embodiment, the non-sulfur organometallic compound can be represented by formula II wherein $R^1$ can be $C_1$-$C_6$ alkyl, X can be chloro and a can be 2.

Non-limiting examples of suitable organosilicon compounds can include, but are not limited to, compounds and mixtures of compounds selected from diethyldichlorosilane, allylmethyldichlorosilane, methylphenyldichlorosilane, phenylethyldiethoxysilane, 3,3,3-trifluoropropylmethyldichlorosilane, trimethylbutoxysilane, sym-diphenyltetramethyldisiloxane, trivinyltrimethylcyclotrisiloxane, octamethylcyclotetrasiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, trimethylmethoxysilane, trimethylethoxysilane, methyltrichlorosilane, methyltrimethoxysilane, methyltriethoxysilane, hexamethyldisiloxane, hexenylmethyldichlorosilane, hexenyldimethylchlorosilane, dimethylchlorosilane, dimethyldichlorosilane, dimethyldimethoxysilane, dimethyldiethoxysilane, hexamethyldisilazane, trivinyltrimethylcyclotrisilazane, polydimethylsiloxanes comprising 3 to about 20 dimethylsiloxy units and trimethylsiloxy or hydroxydimethylsiloxy end blocked poly(dimethylsiloxane) polymers having an apparent viscosity within the range of from 1 to 1000 in mPa·s at 25° C.

Non-limiting examples of suitable organotitanium compounds can include, but are not limited to, tetra($C_1$-$C_{18}$) alkoxy titanates, methyl triethoxy titanium (iv), methyl titanium (iv) triisopropoxide, methyl titanium (iv) tributoxide, methyl titanium (iv) tri-t-butoxide, isopropyl titanium (iv) tributoxide, butyl titanium (iv) triethoxide, butyl titanium (iv) tributoxide, phenyl titanium (iv) triisopropoxide, phenyl titanium (iv) tributoxide, phenyl titanium (iv) triisobutoxide, [Ti(CH$_2$Ph)$_3$(NC$_5$H$_{10}$)] and [Ti(CH$_2$SiMe$_3$)$_2$(NEt$_2$)$_2$].

Non-limiting examples of suitable organozirconium compounds that can include, but are not limited to, tetra($C_1$-$C_{18}$) alkoxy zirconates, phenyl zirconium (iv) trichloride, methyl zirconium (iv) trichloride, ethyl zirconium (iv) trichloride, propyl zirconium (iv) trichloride, methyl zirconium (iv) tribromide, ethyl zirconium (iv) tribromide, propyl zirconium (iv) tribromide, chlorotripentyl zirconium (iv). In alternate non-limiting embodiments, zirconium compounds similar to those described above for the organotitanium compounds and vice-versa are also contemplated.

The amount of bis(alkoxylsilylalkyl)polysulfide and non-sulfur organometallic compound used in the afore-described chemical modification process is that amount which is sufficient to produce a modified filler characterized by a carbon content of greater than 1 wt. %, a sulfur content of greater than 0.1 wt. %, a Silane Conversion Index of at least 0.3 and a Standard Tensile Stress @ 300% elongation of at least 7.0. Such an amount is referred to herein as a coupling amount, i.e., an amount sufficient to bind to the filler and enable the now modified filler to bind to the polymeric composition.

In alternate non-limiting embodiments, the weight ratio of bis(alkoxylsilylalkyl)polysulfide to non-sulfur organometallic compound can vary from at least 0.05:1, or from 0.05:1 to 10:1, or from 0.1:1 to 5:1, or from 0.2:1 to 2:1, e.g., from 0.5:1 to 1:1 or the weight ratio can vary between any combination of these values, inclusive of the recited ranges. The individual organometallic reactants can be added together or sequentially in any order. In a non-limiting embodiment, the organometallic reactants can be present in an amount that provides an excess of organometallic units in relation to the hydroxyl groups available on the inorganic oxide particles for reaction. The upper limit of the amount of organometallic reactants added to the process is not critical. Excess bis(alkoxylsilylalkyl)polysulfide and non-sulfur organometallic compounds can be removed by filtration, distillation, washing with a solvent, or other known separation techniques.

In alternate non-limiting embodiments, the bis(alkoxylsilylalkyl)polysulfide can be replaced by a combination of a bis(alkoxylsilylalkyl)polysulfide and a different sulfur-containing organometallic compound in a weight ratio of bis(alkoxylsilylalkyl)polysulfide to sulfur-containing organometallic compound of from at least greater than 1:1, or 1.01:1, or from 1.01:1 to 100:1, or from 5:1 to 50:1, or from 10:1 to 30:1 or the weight ratio can vary between any combination of these values, inclusive of the recited values. In general, any sulfur-containing organometallic compound (other than the bis(alkoxylsilylalkyl)polysulfide represented by formula I), that can function as a coupling agent in the vulcanization of a filler containing rubber, can be suitable for use in the present invention.

Non-limiting examples of suitable sulfur-containing organometallic compounds can include mercaptoorganometallic reactants that can be represented by the following graphic formula VI:

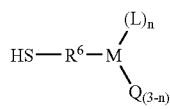

VI wherein M can be silicon, L can be halogen or —OR$^7$, Q can be hydrogen, $C_1$-$C_{12}$ alkyl, or halosubstituted $C_1$-$C_{12}$ alkyl, R$^6$ can be $C_1$-$C_{12}$ alkylene, R$^7$ can be $C_1$-$C_{12}$ alkyl or alkoxyalkyl containing from 2 to 12 carbon atoms, said halogen or (halo) groups being chloro, bromo, iodo or fluoro, and n can be 1, 2 or 3. In a further non-limiting embodiment, R$^6$ can be $C_1$-$C_3$ alkylene, e.g., methylene, ethylene, and propylene, R$^7$ can be $C_1$-$C_4$ alkyl, such as methyl and ethyl, L can be —OR$^6$, and n can be 3. In a non-limiting embodiment, mercaptoorganometallic reactants having two mercapto groups can be used.

In alternate non-limiting embodiments, mercaptoorganometallic compounds in which the mercapto group is blocked, i.e., the mercapto hydrogen atom is replaced by another group, can be used. The blocked mercaptoorganometallic compounds can have an unsaturated heteroatom or carbon bound directly to sulfur via a single bond. Non-limiting examples of blocking groups can include but are not limited to thiocarboxylate ester, dithiocarbamate ester, thiosulfonate ester, thiosulfate ester, thiophosphate ester, thiophosphonate ester, thiophosphinate ester, etc.

In a non-limiting embodiment, when reaction of the mixture to couple the filler to the polymer is desired, a deblocking agent can be present in the mixture to deblock the blocked mercaptoorganometallic compound. If water and/or alcohol are present in the mixture, a catalyst, e.g., tertiary amines, Lewis acids or thiols, can be used to initiate and promote the loss of the blocking group by hydrolysis or alcoholysis to liberate the corresponding mercaptoorganometallic compounds. Various procedures for preparing and using such compounds, e.g., blocked mercaptosilanes, are known in the art, and can include those disclosed in PCT Application No. WO 99/09036, and in U.S. Pat. Nos. 3,692,812 and 3,922,436, which relevant portions are incorporated herein by reference.

Non-limiting examples of suitable mercaptoorganometallic compound(s) can include but are not limited to mercaptomethyltrimethoxysilane, mercaptoethyltrimethoxysilane, mercaptopropyltrimethoxysilane, mercaptomethyltriethoxysilane, mercaptoethyltripropoxysilane, mercaptopropyltriethoxysilane, (mercaptomethyl)dimethylethoxysilane, (mercaptomethyl)methyldiethoxysilane, 3-mercaptopropylmethyldimethoxysilane and mixtures thereof. In alternate non-limiting embodiments, the mercaptoorganometallic compounds can include mercaptopropyltrimethoxysilane, mercaptopropyltriethoxysilane or mixtures thereof.

Non-limiting examples of suitable blocked mercaptosilanes can include but are not limited to 2-triethoxysilyl-1-ethyl thioacetate, 3-trimethoxy-silyl-1-propyl thiooctoate, bis-(3-triethoxysilyl-1-propyl)-methyldithiophosphonate, 3-triethoxysilyl-1-propyldimethylthiophosphinate, 3-triethoxysilyl-1-propylmethylthiosulfate, 3-triethoxysilyl-1-propyltoluenethiosulfonate and mixtures thereof.

In alternate non-limiting embodiments, after the chemical modifying process is essentially complete, the pH of the aqueous suspension of modified inorganic oxide can be increased from the treatment pH of 2.5 or less to a pH of from 3.0 to 10.0. In alternate non-limiting embodiments, the pH of the resulting aqueous suspension can be increased to 3 or higher, or 4 or higher, or 5 or higher, or 6 or higher, and 10 or less, or 9 or less, or 8 or less, or 7 or less, or the pH of the aqueous suspension can vary between any combination of these levels, including the recited levels. This is done to neutralize the added or generated acidity and produce a final product (after drying) having a pH of from 5.0 to 10.0.

In alternate non-limiting embodiments, the modified inorganic oxide can be recovered by filtering and drying or by contacting the aqueous suspension of modified inorganic oxide with a water-immiscible organic solvent at a solvent to inorganic oxide weight ratio greater than 1 to 1, or greater than 5 to 1. The modified inorganic oxide recovered in the solvent phase can be used without further treatment or dried. In a non-limiting embodiment, the present invention can include a composition comprising a slurry of the modified filler in a water-immiscible solvent. The concentration of the modified filler in the slurry can range from 1 to 90 wt. % based on the total weight of the slurry.

Non-limiting examples of suitable water-immiscible organic solvents include low molecular weight siloxanes, such as but not limited to hexamethyldisiloxane, octamethylcyclotetrasiloxane, diphenyltetramethyldisiloxane and trimethylsiloxy end blocked polydimethylsiloxane fluids. When a siloxane is employed as a solvent, it can act both as a solvent and as a reactant with the inorganic oxide. Further non-limiting examples of suitable water-immiscible organic solvents can include aromatic hydrocarbons, such as toluene and xylene; heptane and other aliphatic hydrocarbon solvents; cycloalkanes, such as cyclohexane; ethers, such as diethylether and dibutylether; halohydrocarbon solvents, such as methylene chloride, chloroform, ethylene chloride, and chlorobenzene; and ketones, such as methylisobutylketone.

In alternate non-limiting embodiments, the water-immiscible organic solvent which can be used to contact the aqueous suspension of hydrophobic particulate inorganic oxide can or can not contain one or more materials dissolved therein. Non-limiting examples of such materials can include, but are not limited to, one or more rubbers, oil, coupling agent, antioxidant, and accelerator.

At least one benefit of the chemically modified filler of the present invention is that when compounded with a polymer, such as a rubber composition, alcohol evolution can be substantially suppressed. The reaction of the silica particle with the coupling agent of the present invention, can yield the chemically modified filler of the present invention and a by-product of alcohol. For example, an ethoxy silane produces a by-product of ethanol in reaction with silica. The process of the present invention can be performed in an aqueous environment under conditions that result in essentially complete hydrolysis of the alkoxy group(s). The alcohol by-product produced in the reaction between the coupling agent and silica can be retained in an aqueous phase. The chemically treated filler can be isolated from the aqueous phase (containing the alcohol) resulting in substantially no release of alcohol by the filler. In a non-limiting embodiment, the filler can release less than 4000 ppm alcohol. In another non-limiting embodiment, the filler can be compounded with a rubber composition in conventional amounts and the compounded rubber composition can result in substantially no release of alcohol. In a further non-limiting embodiment, the compounded rubber composition can release less than 4000 ppm alcohol. In a non-limiting embodiment, the rubber composition includes from 10 to 150 parts of filler per 100 parts of rubber composition. "Substantially no release of alcohol" and similar phrases mean that the filler and/or rubber composition do not continue to evolve alcohol; any release of alcohol from the filler and/or rubber composition is a result of alcohol physically trapped and which escapes therefrom.

In a non-limiting embodiment, a rubber composition compounded with the modified filler of the present invention and without the presence of bis(alkoxysilylalkyl)polysulfide can release at least 20% less alcohol than a rubber composition compounded with conventional fillers and the presence of bis(alkoxysilylalkyl)polysulfide.

In a non-limiting embodiment, the modified filler of the present invention (as a powder, granule, pellet, slurry, aqueous suspension or solvent suspension) can be combined with base material, i.e., material used in the product to be manufactured, to form a mixture referred to as a master batch. In the master batch, the modified filler can be present in a higher concentration than in the final product. Aliquots of this mixture can be added to production-size quantities during mixing operations in order to aid in uniformly dispersing very small amounts of such additives to polymeric compositions, e.g., plastics, rubbers and coating compositions.

In another non-limiting embodiment, the modified filler can be combined with emulsion and/or solution polymers, e.g., organic rubber comprising solution styrene/butadiene (SBR), polybutadiene rubber or a mixture thereof, to form a master batch. In a further non-limiting embodiment, a master batch comprising a combination of organic rubber, water-immiscible solvent, modified filler and, optionally, processing oil can be formed. Such a product can be supplied by a rubber producer to a tire manufacturer. At least one benefit to the tire manufacturer of using a master batch is that the modified filler can be uniformly dispersed in the rubber, which can substantially reduce or minimize the mixing time to produce the compounded rubber. In alternate non-limiting embodiments, the master batch can contain from 10 to 150 parts of modified filler per 100 parts of rubber (phr), or from 20 to 130 phr, or from 30 to 100 phr, or from 50 to 80 phr.

In alternate non-limiting embodiments of the present invention, a polymeric article can have dispersed therein from 10 to 150 parts of modified filler per 100 parts of polymer, or from 20 to 130, or from 30 to 100, or from 50 to 80 parts of modified filler per 100 parts of polymer. The amount of modified filler can vary between any combination of these values, inclusive of the recited ranges. As described herein, the polymer can be selected from thermoplastic resins, thermosetting resins and organic rubber. In a non-limiting embodiment, the polymer can be a curable organic rubber.

Non-limiting examples of curable rubbers suitable for use in combination with the modified filler of the present invention are well known to the skilled artisan in rubber chemistry and can include but are not limited to vulcanizable and sulfur-curable rubbers. In a further non-limiting embodiment, the curable rubber can include those materials which are typically used for mechanical rubber goods.

In another non-limiting embodiment, the modified filler of the present invention can be mixed with an uncured rubbery elastomer used to prepare the vulcanizable rubber composition by conventional means such as in a Banbury mixer or on a rubber mill at temperatures between about 100° F. and 300° F. (38° C.-150° C.). In alternate non-limiting embodiments, a vulcanizable rubber composition can contain, based on 100 parts of vulcanizable rubber polymer, from 10 to 150 parts of modified filler, or from 20 to 130 phr, or from 30 to 100 phr, or from 50 to 80 phr. Non-limiting examples of other conventional rubber additives that can be present include but are not limited to the conventional sulfur or peroxide cure systems.

In a non-limiting embodiment, the sulfur-cure system can include 0.5 to 5 parts sulfur, 2 to 5 parts zinc oxide and 0.5 to 5 parts accelerator. In a further non-limiting embodiment, the peroxide-cure system can include 1 to 4 parts of peroxide such as dicumyl peroxide. A wide variety of other conventional rubber additives can also be used. Non-limiting examples of such additives can include but are not limited to other fillers, such as carbon black, oils, plasticizers, accelerators, antioxidants, heat stabilizers, light stabilizers, zone stabilizers, organic acids, such as for example stearic acid, benzoic acid, or salicylic acid, other activators, extenders and coloring pigments. The particular compounding recipe will vary with the particular vulcanizate prepared; but, such recipes are well-known to those skilled in the rubber compounding art.

Another benefit of the present invention can be the ability to achieve desired cure kinetics and physical properties of rubber compounded with the chemically treated filler of the present invention and certain curative components. In a non-limiting embodiment, the desired cure kinetics can include a scorch time of greater than 2.5 minutes and a cure time of less than 30 minutes (TS2 and TC90, respectively, determined according to ASTM D5289-95) with the compounded product having a 300% modulus (determined according to ASTM D412-98a) of at least 6.5 MPa. These cure kinetics and physical properties can be achievable when one or more curative components are included. Suitable curative components can include a wide variety of materials known to a skilled artisan, such as but not limited to accelerators and retardants.

Non-limiting examples of suitable accelerator compositions can include:
benzothiazoles such as:
2-mercaptobenzothiazole,
zinc 2-mercaptobenzothiazole,
2,2'-dithiobisbenzothiazole,
2-morpholinothiobenzothiazole,
2-(4-morpholinothio)-benzothiazole,
2-(4-morpholinodithio)-benzothiazole,
2-(4-morpholinothio)-5-methylbenzothiazole,
2-(4-morpholinothio)-5-chlorobenzothiazole,
2-(2,6-dimethyl-4-morpholinothio)-benzothiazole,
2-(3,6-dimethyl-4-morpholinothio)-benzothiazole,
2,2'-dibenzothiazole disulfide, and
2-mercaptobenzothiazyl disulfide;
benzothiazole sulfenamides such as:
N-cyclohexyl-2-benzothiazole sulfenamide,
N-tert-butyl-2-benzothiazole sulfenamide,
N,N'-dicyclohexyl-2-benzothiazole sulfenamide,
N,N-diisopropyl-2-benzothiazole sulfenamide,
N,N-diethyl-2-benzothiazole sulfenamide,
N-oxydiethylene-2-benzothiazole sulfenamide, and
N-oxydiethylene thiocarbamyl-N-oxydiethylene sulfenamide;
dithiocarbamates such as:
bismuth dimethyldithiocarbamate,
copper dimethyldithiocarbamate,
cadmium diethyldithiocarbamate,
lead diamyldithiocarbamate,
lead dimethyldithiocarbamate,
selenium diethyldithiocarbamate,
selenium dimethyldithiocarbamate,
tellurium diethyldithiocarbamate,
zinc dimethyldithiocarbamate,
zinc diethyldithiocarbamate,
zinc diamyldithiocarbamate,
zinc di-n-butyldithiocarbamate,
zinc dimethylpentamethylenedithiocarbamate, piperidinium pentamethylene dithiocarbamate, 2-benzothiazyl-N,N-diethyldithiocarbamate, and
dimethylammonium dimethyldithiocarbamate;
thiomorpholines such as:
4,4'-dithiodimorpholine,
4-mercaptomorpholine,
4-mercapto-2,6-dimethylmorpholine,
4-[(4-morpholinylthio)thixomethyl] morpholine,
2,6-dimethylmorpholine disulfide,
methyl morpholine disulfide,
propyl 2,6-dimethylmorpholine disulfide,
alkyl morpholine disulfide, and
phenyl morpholine disulfide;
thioureas such as:
trimethylthiourea,
1,3-diethylthiourea,
1,3-dibutylthiourea,
N,N'-dibutylthiourea,
dimethylethylthiourea,
diphenylthiourea, and
tetramethylthiourea;
xanthates such as:
sodium isopropylxanthate,
zinc isopropylxanthate, and
zinc dibutylxanthate;
thiuramsulfides such as:
tetramethylthiuram monosulfide,
tetramethylthiuram disulfide,
tetraethylthiuram disulfide,
tetrabutylthiuram disulfide,
tetrabenzylthiuram disulfide,
dipentamethylenethiuram tetrasulfide,
dimethyldiphenylthiuram disulfide, and
dipentamethylenethiuram monosulfide; and
amines such as:
cyclohexylethylamine,
dibutylamine,
acetaldehyde-aniline condensation products,
heptaldehyde-aniline condensation products; and
guanidines, such as:
    N,N'-diphenylguanidine,
    N,N'-di-o-tolylguanidine,
    orthotolylbiguanidine,
    N,N',N"-triphenylguandine, and
    blends of diarylguanidines.
Non-limiting examples of suitable retardants can include at least one of:
    N-(cyclohexylthio)-phthalimide,
    phthalic anhydride, and
    aromatic sulfenamide.
The vulcanizable rubber composition can be vulcanized or cured to a rubber vulcanizate in accordance with customary procedures known in the rubber industry. Non-limiting examples of industrial rubber vulcanizates (articles) which can be produced utilizing the modified filler of the present invention can include wire and cable jacketing, hoses, gaskets and seals, industrial and automotive drive-belts, engine mounts, V-belts, conveyor belts, roller coatings, tires and components of tires, such as vehicle tire treads, subtreads, tire carcasses, tire sidewalls, tire belt wedge, tire bead filler, and tire wire skim coat, shoe sole materials, packing rings, damping elements and many others.

The present invention is more particularly described in the following discussion of the Standard Compound Protocol, Examples and Comparative Examples which are intended as illustrative only since numerous modifications and variations therein will be apparent to those skilled in the art.

Standard Compounding Protocol

The Standard Compounding Protocol was used to prepare test samples of formulated rubber compositions containing the silica of the Examples and Comparative Examples (CE).

Part A

The following ingredients in amounts of parts per hundred parts of rubber by weight (phr) were added in the order described to a polyethylene bag held erect in a 500-milliliter (mL) plastic cup:

| Material | Amount (phr) |
| --- | --- |
| Processing oil[1] | 30.0 |
| Zinc oxide[2] | 2.5 |
| Antiozonant[3] | 2.0 |
| Stearic acid[4] | 1.0 |
| Filler Sample | 12.5 |

[1]Sundex ® 8125 aromatic hydrocarbon processing oil, obtained commercially from Sun Company, Inc., Refining and Marketing Division.
[2]Kadox ® surface treated zinc oxide, obtained commercially from Zinc Corporation of America.
[3]Wingstay ® 100 antiozonant, a mixture of diaryl p-phenylenediamines, obtained commercially from The Goodyear Tire & Rubber Co.
[4]Rubber grade stearic acid, obtained commercially from C. P. Hall.

Part B

A 1.89 liter (L) Farrel Banbury mixer (Model "BR") was used for mixing the various ingredients. Immediately prior to adding the batch ingredients to the mixer, 800 grams (g) of CV-60 grade natural rubber was put through the mixer to clean it of any residue of previous runs and increase the temperature to about 93° C. (200° F.). After removing the rubber, the mixer was cooled to about 65° C. (150° F.) before adding the ingredients to produce the rubber test sample.

A rubber composition is prepared using the test filler, the following other enumerated ingredients and the procedure described hereinafter.

| Ingredient | Amount (phr) | Time at which material was added to or ((removed from)) mixer in minutes | Rotor speed (rpm) |
| --- | --- | --- | --- |
| First Pass | | | |
| SBR Rubber[5] | 70.0 | 0 | 116 |
| BR Rubber[6] | 30.0 | 0 | 116 |
| Test Filler | 57.5 | 0.5 | 116 |
| Sample from Part A | All | 3.0 | 116 |
| Dump contents | | ((5.0)) | |
| Second Pass | | | |
| Product of First Pass | All | 0 | 77 |
| Antiozonant[7] | 2.0 | 0 | 77 |
| Petroleum Wax[8] | 1.5 | 0 | 77 |
| RM Sulfur[9] | 1.4 | 0.5 | 77 |
| TBBS[10] | 1.7 | 0.5 | 77 |
| DPG[11] | 2.0 | 0.5 | 77 |
| Dump contents | | ((4.0)) | |

[5]Solflex ® 1216 solution styrene-butadiene rubber (SBR) obtained commercially from The Goodyear Tire & Rubber Co.
[6]Budene 1207 butadiene rubber (BR) obtained commercially from The Goodyear Tire & Rubber Co.
[7]Santoflex ® 13 antiozonant, described as N-(1,3-dimethylbutyl)-N'-phenyl-p-phenylenediamine, obtained commercially from Flexsys.
[8]Okerin ® 7240 microcrystalline wax/paraffin wax blend obtained commercially from Astor Corporation.
[9]Rubber Makers (RM) sulfur, 100% active, obtained commercially from Taber, Inc.
[10]N-tert-butyl-2-benzothiazolesufenamide, obtained commercially from Monsanto.
[11]Diphenylguanidine, obtained commercially from Monsanto.

The first pass was initiated by adding the rubber, viz., SBR and BR, to the mixer and mixing for 0.5 minute at 116 rpm. The rotor speed was maintained at 116 rpm and 57.5 phr of the treated filler sample was added. After a further 1.5 minute, the ram was raised and the chute swept, i.e., the covering on the entry chute was raised and any material that was found in the chute was swept back into the mixer. After a further minute, the sample from Part A was added. After another minute, the ram was raised and the chute swept. The contents in the mixer were mixed for an additional minute to achieve a maximum temperature in the range of from 145 to 150° C. (293 to 302° F.) and to complete the first pass in the mixer. Depending upon the type of sample, the rotor speed of the mixer can be increased or decreased after 4 minutes to achieve a temperature in the foregoing range within the specified mixing period.

After completing the first pass, the temperature of the material was determined with a thermocouple to verify that it did not exceed the maximum temperature of 150° C. The removed material was weighed and sheeted in a Farrel 12 inch, two-roll rubber mill at 2.032 mm±0.127 mm (0.080 inch±0.005 inch). The resulting milled stock was cut into strips in preparation for the second pass in the mixer.

A minimum of one hour was allotted between the completion of the first pass in the mixer and the beginning of the second pass to allow the milled stock to cool. If necessary, the afore-described cleaning and warming-up procedure using CV-60 grade natural rubber was completed prior to initiating the second pass. The temperature of the mixer was adjusted to approximately 49° C. (120° F.). With the cooling water running, the second pass was initiated by adding the strips of first pass stock to the mixer operating at 77 rpm and the pre-weighed combination of Santoflex® 13 antiozonant and Okerin® 7240 microcrystalline wax/paraffin wax blend. After 0.5 minute, the second addition of the combination of RM Sulfur, TBBS and DPG was added. After a further 1.5 minutes, the ram was raised and the chute swept. The second pass was completed by mixing the stock an additional 2.0 minutes while maintaining the temperature at or below 125° C. (257° F.).

Part C

A Farrel 12 inch, two-roll rubber mill was heated to approximately 60° C. (140° F.). The stock from the second pass of Part B was fed into the running mill with a nip setting of 2.032 mm±0.127 mm (0.080 inch±0.005 inch). The resulting sheet was placed on a flat surface until the temperature of the sheet reached room temperature. Typically, the sheet cooled within about 30 minutes. Afterwards, the milled sheet was fed into the rubber mill with a nip setting of 3.81 mm±0.51 mm (0.15 inch±0.02 inch). The rolling bank was adjusted, if necessary, to maintain a uniform thickness. The resulting material was subjected to 16 side cuts and then 8 end passes. The rubber mill nip was adjusted to produce a sheet thickness of 2.032 mm±0.127 mm (0.080 inch±0.005 inch). The sheet stock collected off the mill was placed on a flat clean surface. Using a stencil, a rectangular sample 203.2 mm×152.4 mm (8 inches×6 inches) was cut from the sheet stock. The sample was conditioned, i.e., stored between clean polyethylene sheets and maintained for 15 to 18 hours at a temperature of 23°±2° C., and a relative humidity of 50%±5%.

After conditioning, the sample was placed in a 203.2 mm×152.4 mm×2.286 mm (8 inches×6 inches×0.09 inch) standard frame machine steel compression mold having a polished surface. The sample was cured in a 61 centimeter×61 centimeter (24 inches×24 inches) 890 kilonewton (100 ton) 4-post electrically heated compression press, for T90, i.e., the time it takes for 90 percent of the cure to occur, in accordance with ASTM D-2084, plus 5 minutes at 150° C. (302° F.) under a pressure of 13.79 megapascals (2000 pounds per square inch). Typically, curing was completed within about 10 minutes. The resulting cured rubber sheet was removed from the mold and maintained for 15 to 18 hours at a temperature of 23°±2° C. (73.4±3.6° F.), and a relative humidity of 50%±5% prior to testing in Part D.

Part D

Testing was performed in accordance with ASTM D 412-98a—Test Method A. Dumbbell test specimens were prepared using Die C. An Instron model 4204 with an automated contact extensiometer for measuring elongation was used. The cross-head speed was found to equal 508 mm/min. All calculations were done using the Series IX Automated Materials Testing software supplied by the manufacturer. The Reinforcement Index equals the Tensile Stress at 300% elongation (in MPa) divided by the Tensile Stress at 100% elongation (in MPa). When the samples were prepared using the Standard Compounding Protocol, the results were reported as the Standard Reinforcement Index.

Preparation of Precipitated Silica

A precipitated silica was produced by acidifying a sodium silicate solution with sulfuric acid. The majority of the precipitate was formed at a pH above 8.5. Further precipitate was produced by continuing the acid addition until the solution pH reached a level of about 3.5.

A sample of the precipitated silica for surface area analysis, as described in Example 9, was prepared by filtering and washing a portion of the silica until the rinse water demonstrated a conductivity level of from about 300 to 800 microohms. The resulting filter cake was re-liquefied using a high shear agitator to form a solid in liquid suspension. The suspension was dried in a Niro spray drier (inlet temperature about 360° C. and the outlet temperature about 110° C.). Listed in Table 1 are the surface areas of the precipitated silica used to prepare the modified silica of the Examples and Comparative Examples.

EXAMPLES 1-2

Approximately 40 kilograms (kg) of a precipitated silica suspension of which about 5.2 kg is silica and about 11.7 kg of isopropyl alcohol were added to a 30 gallon glass lined vessel having a bottom drain. The vessel was also equipped with a temperature recorder, mechanical stirrer, means for heating and a condenser.

While the contents of the vessel were stirred and heating initiated, Si-69 reinforcing agent, referred to herein as TESPT, was added over an interval of time (typically, about 10 minutes) that would yield the approximate amounts listed for weight percent of TESPT per silica on a dry basis for the examples listed in Table 3. After completion of the TESPT addition, dimethyldichlorosilane (DMDCS) was added in an identical manner to yield the approximate amounts listed for weight percent of DMDCS per silica on a dry basis in Table 3. The weight ratios of TESPT/DMDCS is also listed in Table 3. The resulting pH of the solutions was about 0.8.

After completion of the DMDCS addition, the mixture was heated to about 68° C. and held at this temperature for about 10 minutes. While cooling, enough toluene (typically 15 kg) was added to the stirred mixture to effect separation of the hydrophobic precipitated silica from the aqueous phase without forming an emulsion. The aqueous phase was drained from the vessel. The stirred mixture in the vessel containing the hydrophobic precipitated silica was then washed twice with about 30 kg for Example 1 and about 40 kg for Example 2 of water containing about 400 grams for Example 1 and 500 grams for Example 2 of sodium bicarbonate. The aqueous phase was drained.

After washing was completed, enough additional toluene (about 13.9 kg for Example 1 and 23.7 kg for Example 2) was added to the stirred mixture to make a flowable solid-in-liquid suspension that could be easily discharged from the vessel. The resulting suspension was dried in a rotocone drier under vacuum (minimum 23 inches of mercury) at a minimum of 140° C. Drying was continued until the samples showed a wt. % loss of less than 4.5% when exposed to 160° C. for 10 minutes.

EXAMPLE 3-8

Approximately 19 kg of a precipitated silica suspension of which about 1.5 kg is silica was added to a 40 liter glass vessel having a bottom drain. The vessel was also equipped with a temperature recorder, mechanical stirrer, means for heating and a condenser.

While the contents of the vessel were stirred, about 1 weight percent per silica on a dry basis of the surfactant listed in Table 2 was added. After completion of the surfactant addition, the resulting mixture was stirred for 5 minutes. TESPT was added over a 5 minute interval to the stirred mixture to yield about 10 weight percent of TESPT per silica on a dry basis. The resulting pH of the solution was about 3.0. After completion of the TESPT addition, dimethyldichlorosilane (DMDCS) was added in an identical manner to yield about 15 weight percent of DMDCS per silica on a dry basis. The resulting pH of the solution ranged from about 0.9 to 1.6. The mixture was heated to from about 61 to 68° C. and held at this temperature for typically about 20 minutes. The suspensions of Examples 5 and 8 were heated for about 40 and about 16 minutes, respectively. While cooling, enough 50 wt. % NaOH was added to the mixture over an interval of time (typically 10-15 minutes) to adjust the pH to about 7.0. 20 L of the stirred mixture containing the hydrophobic precipitated silica was discharged from the vessel, vacuum filtered using a Buchner funnel and then washed three times with about 8 kg of water each wash. After washing was completed, enough deionized water and high shear agitation was applied to the filter cake to make a flowable solid in liquid suspension. The resulting suspension was spray dried in a Niro spray drier (inlet temperature about 400° C. and the outlet temperature about 150° C.) to form the treated silica samples of Examples 3-8.

COMPARATIVE EXAMPLES 1-3

17 L of the untreated precipitated silica used in Examples 1-2 containing 820 grams of silica was added to a vessel equipped with a mechanical stirrer. The pH of the slurry before treatment was about 6.5. While the stirrer was mixing the suspension, enough TESPT was added to yield the approximate amount listed for weight percent of TESPT per silica on a dry weight basis for Comparative Examples 1-3 listed in Table 3. The resulting treated suspensions were dried in a Niro spray drier (inlet temperature about 360° C. and the outlet temperature about 110° C.).

EXAMPLE 9

The surface area of the treated and untreated test silica samples of Examples 1-8 and Comparative Examples (CE) 1-3 was determined using a Horiba 6200 series instrument by a dynamic single point surface area technique, ASTM D3037- 93, Procedure C (modified). This procedure simulates the Brunauer-Emmett-Teller (BET) method at $P/P_o=0.294$ using 30% nitrogen-in-helium as the adsorbate gas. The ASTM procedure was modified as follows: a 30% nitrogen-in-helium gas mixture was used; a flow of approximately 40 mL/min was maintained; samples were dried in the analysis cells under a flow of nitrogen at 180±5° C. for one hour; and the adsorbed nitrogen on the sample was desorbed by removing the dewar of liquid nitrogen and allowing the sample to warm to room temperature with no external heat source. Results for the untreated test silica samples are listed in Table 1 and for the treated test silica samples are listed in Table 4.

The percent carbon was determined by CHN analysis using a Carlo Erba model 1106 elemental analyzer. A 1-2 mg sample in a sealed tin capsule was burned in an oxygen enriched atmosphere at 1040° C. with a Helium carrier, quantitatively combusted over $Cr_2O_3$, then the combustion gases were passed over Cu at 650° C., to eliminate the excess oxygen and reduce the oxides of nitrogen to nitrogen. The gases were then passed through a chromatographic column, separated and eluted as $N_2$, $CO_2$, and $H_2O$. The eluted gases were measured by a thermal conductivity detector. The instrument was calibrated by combustion of standard compounds. Results are listed in Table 4.

The percent sulfur was determined by x-ray fluorescence spectrometry (XRF), using a Rigaku RIX 2000 wavelength-dispersive spectrometer. Samples were briquetted into aluminum support cups at 344.75 megapascals (25 tons/in$^2$) pressure after mixing with SpectroBlend® binder (Chemplex Industries, Tuckahoe, N.Y.) in a 1:1 weight ratio. NIST- and NBS-traceable secondary standards (PPG production silicas, or equivalent) were used for the empirical XRF calibration. Detection was via a gas-proportional flow counter using a germanium crystal monochromator. Results are listed in Table 4.

The Silane Conversion Index reported as SCI in Table 4 was determined by solid state $^{29}Si$ NMR. This data was collected at ambient temperature on a Bruker AM-300 NMR with a narrow bore magnet and a Doty 7 mm standard speed MAS probe. Samples were packed into 7 mm o. d. zirconia rotors and sealed with short Kel-F caps. The rotors were spun at the Magic Angle with a speed of about 5.0 kHz. Cross Polarization (CP/MAS) data was collected using a 90° $^1H$ pulse, 5600-8400 scans per spectrum, a 5 msecond contact time, high power proton decoupling during data acquisition, and a 3 second relaxation delay. Hartmann-Hahn conditions were achieved using a kaolinite sample (J. Rocha and J. Klinowski, *J. Magn. Reson.*, 90, 567 (1990)). All chemical shifts were referenced externally to tetramethylsilane (TMS).

All spectra were analyzed using a nonlinear curve fitting program (LINESIM) on an Aspect 3000 computer to determine the relative area % for the $T^1$ (−49 ppm), $T^2$ (−57 ppm), and $T^3$ (−65 ppm) peaks. Area % values for $T^1$, $T^2$, and $T^3$ were determined by curve fitting over the region of −30 ppm to −80 ppm.

pH determinations were made on the treated silicas of the Examples and Comparative Examples by the following procedure: add 5.0 g of silica (in powder form) to a 150 mL beaker containing a magnetic stir bar; add 50 mL of isopropanol and 50 mL of deionized water; and stir vigorously without splashing until the silica is suspended. Place a calibrated pH electrode in the vigorously stirring solution and record the pH reading after one minute (±5 sec). The results are listed in Table 4.

The Soxhlet Extractable percent carbon of the treated silica of Example 1 was determined by adding 5.44 grams of the material to a 43 mm×123 mm (internal diameter×external length) cellulose extraction thimble which was placed into an appropriately sized Soxhlet extraction tube which was fitted with a condenser. This Soxhlet extractor and condenser system was attached to a round bottom flask containing 700 mL of toluene. The flask heated to the reflux temperature of the toluene. After refluxing for 25 hours, the used toluene was replaced with unused toluene and refluxing was continued for 22.5 hours. The resulting extracted treated silica was recovered and dried until a sample showed a 1.0 weight percent loss when exposed to 160° C. for 10 minutes. The percent carbon of the extracted sample was determined using the procedure described herein. The Soxhlet extractable percent carbon was determined using the following equation:

$$\frac{(\% \text{ carbon before extraction}) - (\% \text{ carbon after extraction})}{(\% \text{ carbon before extraction})} \times 100$$

The percent carbon before extraction was 3.50 and the percent carbon after extraction was 3.02. Therefore, the Soxhlet Extractable percent carbon of the treated silica of Example 1 was 13.7.

Alcohol emissions was determined using headspace-GC analysis under the following conditions:

Headspace Oven: 150° C.

Vial Equilibration Time: 20 min.

Column: 30M×0.53 mm ID DB-Wax (1.0 mm film)

Temp. Program: 35° C.-5 min-10° C./min-220° C.-8.5 min.

Inj. Port Temp.: 200° C.

TABLE 1

| Untreated Silica Used in Examples | Surface Area $M^2/g$ |
|---|---|
| 1-2 & CE1-3 | 198 |
| 3-8 | 180 |

TABLE 2

| Example No. | Surfactant |
|---|---|
| 3 | MAFO ® CAB[12] |
| 4 | MASIL ® SF 19[13] |
| 5 | AVANEL ® N-1525/90[14] |
| 6 | MACOL ® 48[15] |
| 7 | BRIJ ® 35[16] |
| 8 | ETHOMEEN 18/60[17] |

[12] A amphoteric surfactant, reported to be based on cocamidopropyl aminobetaine, available from BASF.
[13] A nonionic surfactant, reported to be based on ethoxylated silicone, available from BASF.
[14] A nonionic surfactant, reported to be based on an alkylchloride end-capped ethylene oxide, available from BASF.
[15] A nonionic surfactant, reported to be based on glycol ether, available from BASF.
[16] A nonionic surfactant, reported to be based on an polyoxethylene lauryl ether, available from Aldrich Chemical Co.
[17] A nonionic/cationic, reported to be based on ethoxylated (50)stearylamine, available from AKZO Chemical, Inc.

TABLE 3

| Example # | % TESPT/$SiO_2$ | % DMDCS/$SiO_2$ | Ratio TESPT/DMDCS |
|---|---|---|---|
| 1 | 10.0 | 15.0 | 0.67:1 |
| 2 | 10.0 | 15.0 | 0.67:1 |
| 3 | 10.0 | 15.0 | 0.67:1 |
| 4 | 10.0 | 15.0 | 0.67:1 |
| 5 | 10.0 | 15.0 | 0.67:1 |
| 6 | 10.0 | 15.0 | 0.67:1 |
| 7 | 10.0 | 15.0 | 0.67:1 |
| 8 | 10.0 | 15.0 | 0.67:1 |
| CE1 | 5.0 | 0.0 | 5:0 |
| CE2 | 7.5 | 0.0 | 7.5:0 |
| CE3 | 10.0 | 0.0 | 10:0 |

TABLE 4

| Example # | Surface Area ($m^2/g$) | pH | Carbon (wt. %) | Sulfur (wt. %) | SCI** | STS @ 300%*** |
|---|---|---|---|---|---|---|
| 1 | 126 | 7.2 | 3.5 | 1.78 | ND* | 9.4 |
| 2 | 124 | 7.4 | 3.4 | 1.50 | 0.53 | 9.9 |
| 3 | 114 | 9.1 | 3.7 | 1.12 | ND* | 8.0 |
| 4 | 112 | 8.3 | 3.6 | 1.09 | ND* | 7.7 |
| 5 | 115 | 9.4 | 3.5 | 1.32 | ND* | 7.8 |
| 6 | 124 | 8.4 | 2.3 | 0.83 | ND* | 8.0 |
| 7 | 111 | 9.5 | 3.8 | 1.12 | ND* | 7.1 |
| 8 | 104 | 8.4 | 3.8 | 1.36 | ND* | 8.1 |
| CE 1 | 167 | 6.7 | 0.7 | 0.77 | ND* | 3.6 |
| CE 2 | 153 | 6.9 | 1.3 | 1.25 | ND* | 6.1 |
| CE 3 | 148 | 6.9 | 1.7 | 1.60 | 0.06 | 6.2 |

ND* indicates that the test was not done.
SCI** represents the Silane Conversion Index.
STS @ 300%*** represents the Standard Tensile Stress @ 300% elongation.

The results of Table 1 show that the untreated silicas used in the process of producing the modified silicas of the Examples and Comparative Examples had a surface area that ranged from 180 to 198 $m^2/g$.

The results of Table 4 show that the treated silica samples of the present invention demonstrated a Standard Tensile Stress @ 300% elongation of at least 7.0, a Carbon weight percent of greater than 1.0, a Sulfur weight percent greater than 0.1 and a Silane Conversion Index greater than 0.3.

Comparative Example 1 had a Carbon weight percent lower than the required amount and demonstrated an STS @ 300% of 3.6. Both Comparative Examples 2 and 3 had carbon and sulfur levels within the necessary ranges, but both had an STS @ 300% of less than 7.0. Comparative Example 3 also had a SCI value less than the required value.

Although the present invention has been described with references to specific details of certain embodiments thereof, it is not intended that such details should be regarded as limitations upon the scope of the invention except in so far as they are included in the claims.

Although the present invention has been described with references to specific details of certain embodiments thereof, it is not intended that such details should be regarded as limitations upon the scope of the invention except in so far as they are included in the claims.

What is claimed is:
1. In the process of producing a chemically modified siliceous filler by contacting an acidic aqueous suspension of amorphous precipitated silica with a coupling agent to form an acidic aqueous suspension of chemically modified precipitated silica, optionally in the presence of a surfactant and/or a water miscible solvent, and recovering said chemically modified filler, the improvement comprising:

(A) providing an acidic aqueous suspension of amorphous precipitated silica having a pH of 2.5 or less;
(B) contacting the precipitated silica with a coupling agent comprising a combination of:
(a) bis(alkoxysilylalkyl)polysulfide and (b) non-sulfur organometallic compound(s), the weight ratio of (a) to (b) being at least 0.05:1, under conditions that result in essentially complete hydrolysis of any alkoxy groups associated with the coupling agent, thereby to produce chemically modified precipitated silica;
(C) raising the pH of the acidic aqueous suspension of chemically modified precipitated silica to from 3.0 to 10 with acid neutralizing agent that does not adversely affect the chemically modified precipitated silica; and
(D) separating chemically modified precipitated silica from the aqueous phase while retaining in the aqueous phase substantially all of any alcohol by-product produced by hydrolysis of alkoxy groups associated with the coupling agent, said chemically modified precipitated silica having (i) a carbon content of greater than 1 weight percent, (ii) a sulfur content of greater than 0.1 weight percent, (iii) a Silane Conversion Index of at least 0.3, and (iv) a Standard Tensile Stress at 300 percent elongation of at least 7.0 when incorporated into a vulcanized rubber composition.

2. The process of claim 1 wherein water-miscible alcohol by-product is produced from hydrolysis of alkoxy groups associated with the coupling agent; and less than 4000 ppm of alcohol is released from said separated chemically modified amorphous precipitated silica.

3. The process of claim 1 wherein the bis(alkoxysilylalkyl)polysulfide is represented by the following formula I:

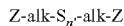

Z-alk-$S_{n'}$-alk-Z   I in which alk is a divalent hydrocarbon radical having from 1 to 18 carbon atoms; n' is a whole number of 2 to 12 and Z is:

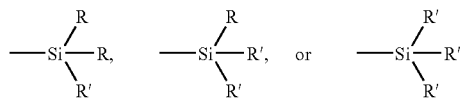

wherein R is a $C_1$-$C_4$ alkyl or phenyl group, and R' is a $C_1$-$C_8$ alkoxy, a $C_5$-$C_8$ cycloalkoxy, or a $C_1$-$C_8$ alkylmercapto group.

4. The process of claim 1 wherein said non-sulfur organometallic compound(s) is an alkylsilane.

5. The process of claim 4 wherein said alkylsilane is chosen from compound(s) represented by the following formulae II, III, IV, and V:

$R^1_a SiX_{(4-a)}$   II

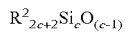
$R^2_{2c+2} Si_c O_{(c-1)}$   III

$R^3_{2d} Si_d O_d$   IV

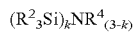
$(R^2_3 Si)_k NR^4_{(3-k)}$   V and mixtures of said alkyl silane compounds; wherein each $R^1$ is independently a hydrocarbon group of from 1 to 18 carbon atoms or $R^1$ is an organofunctional hydrocarbon group of from 1 to 12 carbon atoms wherein said organo functionality is amino, carboxylic acid, carbinol ester, or amido; each X is independently chosen from halogen, amino, alkoxy groups of from 1 to 12 carbon atoms and acyloxy groups of from 1 to 12 carbon atoms; a is the integer 1,2 or 3; each $R^2$ is independently halo, hydroxy, or a hydrocarbon group containing from 1 to 18 carbon atoms with the proviso that at least 50 mole percent of the $R^2$ substituents are hydrocarbon groups containing from 1 to 18 carbon atoms; c is an integer from 2 to 10,000; each $R^3$ is independently halo, hydroxy, or a hydrocarbon group containing from 1 to 18 carbon atoms; d is an integer from 3 to 20; each $R^4$ is independently hydrogen or a hydrocarbon group containing from 1 to 18 carbon atoms; and k is 1 or 2; said halo or halogen being chosen from chloro, fluoro, bromo or iodo.

6. The process of claim 1 wherein the bis(alkoxysilylalkyl)polysulfide is replaced by a combination of bis(alkoxysilylalkyl)polysulfide and mercaptoorganometallic material in a weight ratio of bis(alkoxysilylalkyl)polysulfide to mercaptoorganometallic material of at least 1:1.

7. The process of claim 6 wherein the mercaptoorganometallic material is represented by the following graphic formula VI:

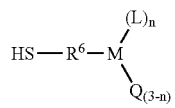

VI wherein M is silicon, L is halogen or —$OR^7$, Q is hydrogen, $C_1$-$C_{12}$ alkyl, or halosubstituted $C_1$-$C_{12}$ alkyl, $R^6$ is $C_1$-$C_{12}$ alkylene, $R^7$ is $C_1$-$C_{12}$ alkyl or alkoxyalkyl containing from 2 to 12 carbon atoms, said halogen or (halo) groups being chloro, bromo, iodo or fluoro, and n is 1,2 or 3.

8. The process of claim 7 wherein the mercapto group of the mercaptoorganometallic material is blocked.

9. The process of claim 1 wherein the weight ratio of (a) bis(alkoxysilylalkyl)polysulfide to (b) non-sulfur organometallic compound(s) ranges from 0.1:1 to 5:1, and the pH of the recovered chemically modified precipitated silica ranges from 5 to 10.

10. The process of claim 9 wherein the acidic aqueous suspension of amorphous precipitated silica has a pH of 2.0 or less, and the precipitated silica is contacted with the coupling agent at temperatures in the range of 30° C. to 150° C.

11. The process of claim 10 wherein the acid neutralizing agent is chosen from sodium hydroxide, potassium hydroxide, ammonium hydroxide and sodium bicarbonate.

12. The process of claim 10 wherein the chemically modified precipitated silica has (i) a carbon content of at least 1.5 weight percent, (ii) a sulfur content of at least 0.3 weight percent, (iii) a Silane Conversion Index of at least 0.4, and (iv) a Standard Tensile Stress at 300 percent elongation of at least 7.5 when incorporated into a vulcanized rubber composition.

* * * * *